United States Patent [19]

Stolz et al.

[11] 4,330,160
[45] May 18, 1982

[54] BEARING CAGE, IN PARTICULAR FOR TWO-ROW ANGULAR CONTACT BALL BEARINGS

[75] Inventors: Robert Stolz; Günter Neder, both of Schweinfurt, Fed. Rep. of Germany

[73] Assignee: SKF Kugellagerfabriken GmbH, Schweinfurt, Fed. Rep. of Germany

[21] Appl. No.: 130,137

[22] Filed: Mar. 13, 1980

[30] Foreign Application Priority Data

Mar. 17, 1979 [DE] Fed. Rep. of Germany ... 7907497[U]

[51] Int. Cl.³ .................. F16C 19/20; F16C 33/38
[52] U.S. Cl. .................. 308/201; 308/188; 308/189 R; 308/196
[58] Field of Search ............ 308/201, 188, 198, 193, 308/187, 189 R, 196

[56] References Cited

U.S. PATENT DOCUMENTS

| 1,311,769 | 7/1919 | Ohlsson | 308/201 |
| 3,645,592 | 2/1972 | Flandrena | 308/201 X |
| 4,153,309 | 5/1979 | Markfelder et al. | 308/201 X |

FOREIGN PATENT DOCUMENTS 966128  2/1962  United Kingdom ............ 308/201

Primary Examiner—Henry K. Artis
Attorney, Agent, or Firm—Daniel M. Rosen

[57] ABSTRACT

A bearing cage having two rings connected by webs for angular contact two-row ball bearings where the bearing cage ring has cage pockets of a partial spherical shape. The radial plane of the bearing passes through the centers of the partial spheres and is placed off-center with respect to the bearing cage ring faces, the distance between the radial plane and the face less distant from the radial plane being preferably equal to the radius of the ball.

4 Claims, 4 Drawing Figures

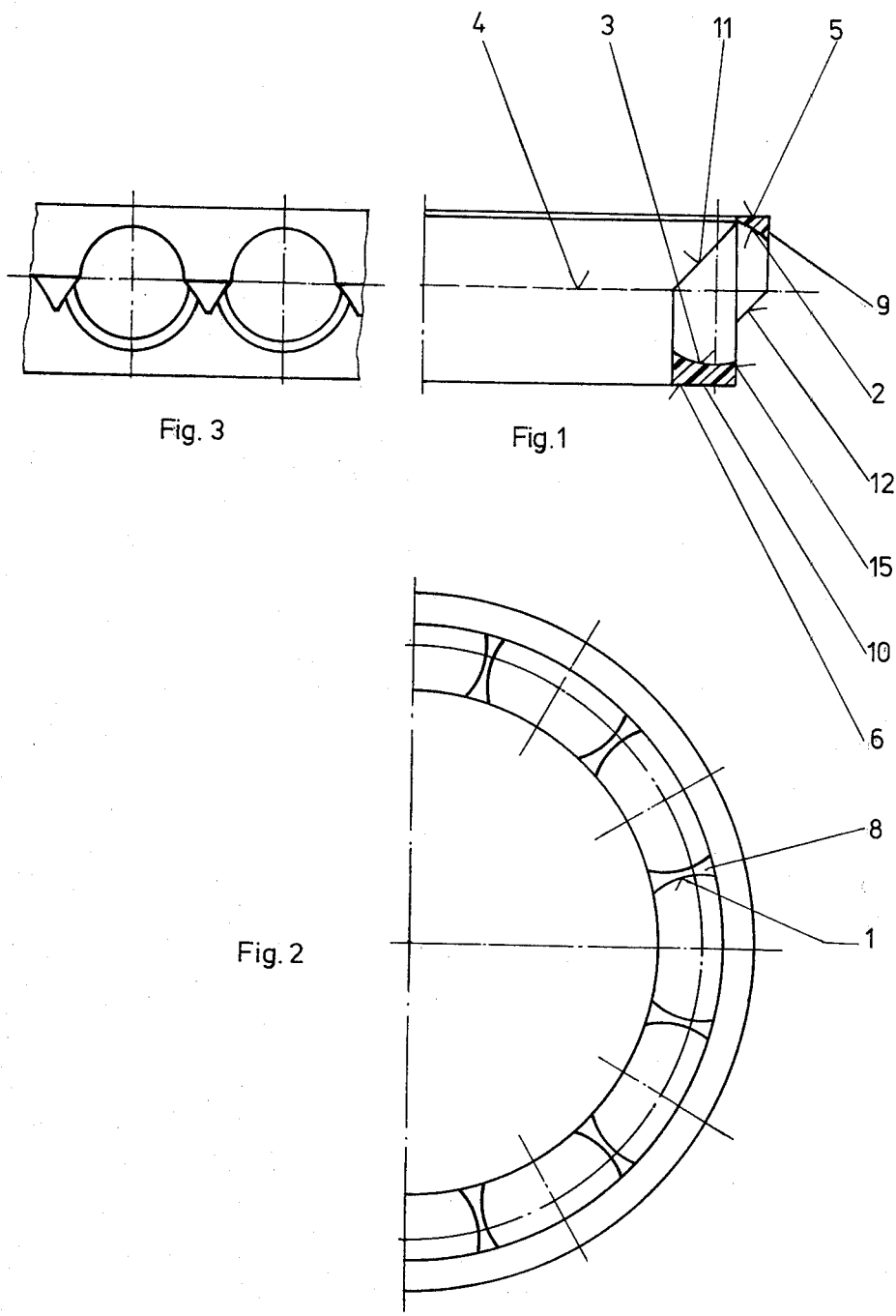

BEARING CAGE, IN PARTICULAR FOR TWO-ROW ANGULAR CONTACT BALL BEARINGS

The present invention relates to bearing cages having two rings connected by webs, and more particularly to angular contact two-row ball bearings having cage pockets of partial spherical shape.

Such cages are known and disclosed in French Pat. No. 1,145,720. In such known cages, for example when used for angular contact two-row ball bearings, the optimum load base of the bearing cannot be realized because the cage rings, to achieve adequate strength, must be made comparatively wide in the axial direction.

In the German Disclosure Document No. 1,750,106, an injection-molded plastic cage for oblique ball bearings is disclosed wherein the edges of the ball recesses are in the shape of partial spherical surfaces, which do not lie completely in a common hemisphere nor do they overlap in their axial projection. This known design has the disadvantage that the edges left by the axially retractable pocket dies lie near the pitch circle and hence in the contact region of the balls, which in certain cases may lead to premature bearing failure for lack of lubricant. In addition, these known cages, when installed in angular contact two-row ball bearings, result in an inobtainable optimal load base for the bearing.

It is thus the prime object of the present invention to provide a stable cage by means of which an optimum load base for a two-row ball bearing is achieved.

In accordance with the present invention, a cage structure is provided wherein the cage pockets are partial spheres, and the central axis thereof is off-center relative to the side faces, the axis being spaced from the closer face by a distance equal to the ball radius. As a result of this extremely thin wall thicknesses may be realized between the ball pockets, thus achieving close spacing of the balls and a high load capacity of the bearing. Further, this feature causes the edges formed by the parting between the pocket dies reside outside the contact area of the balls, so that the lubricant film on the balls will not be ruptured.

The foregoing objects and brief description will become more apparent from the following more detailed description and appended drawings, wherein:

FIG. 1 shows one half of a plastic cage according to the invention, in sectional view;

FIG. 2 shows a top view of the cage according to FIG. 1;

FIG. 3 shows a partial side view of the cage shown in FIG. 1; and

Figure 4:
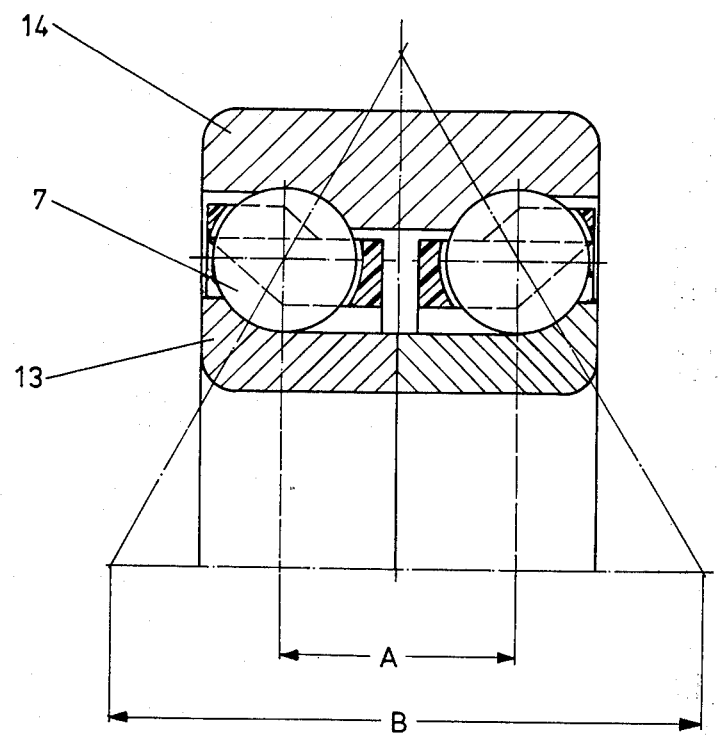
FIG. 4 shows a cross section of an angular contact two-row ball bearing using the cage according to the present invention.

FIGS. 1 to 3 represent a plastic cage produced by molding or casting, and which for example may be used for an angular contact two-row ball bearing as represented in FIG. 4, with cage pockets 1 having the shape of partial spheres 2, 3. The radial plane 4 passing through the centers of the partial spheres 2, 3 is arranged off-center relative to the faces 5, 6. The face 5 is closer to the radial plane 4 than the face 6, and the distance from the plane 4 to the face 5 is preferably equal to the radius of a ball 7 (FIG. 4). The webs 8 of the cage are joined by rings 9 and 10, ring 9, whose face 5 is less distant from the radial plane 4, being arranged above the pitch circle. This design, according to the present invention, in the case of an angular contact two-row ball bearing as represented in FIG. 4, permits a ball spacing A like that of a cage open on one side, because the spherical embrace of ring 9 does not commence until above the pitch circle, and the balls 7 protrude as far as the face 5 of ring 9. The load base B of the angular contact ball bearing shown in FIG. 4 is thus optimal, while ring 9 of the cage has a sufficient cross section for good cage stability. The parting of the axially retractable pocket dies (not shown) is located ouside and above the pitch circle in the cage according to the invention. This location of the parting allows the use of parted pocket dies even with extremely thin wall thicknesses between the cage pockets 1, yet the thin webs 8 cannot break off at the parting, because the off-center position of the parting results in a substantially larger cross section in that part of the webs 8 than in the known arrangement with the parting centered on the pocket. The webs 8 are provided at their free edges with bevels 11, 12 to suit the cross sectional shape of the races 13, 14. The edge formed by the parting of the pocket dies when molding or casting is indicated by 15 in FIG. 1.

The embodiment thus described is only an example of the cage in accordance with the present invention. Modifications of design may readily be made in the spirit of modification. Thus, for example, the cage rings whose face is less distant from the radial plane 4 may alternatively be arranged outside and below the pitch circle, and the parting of the axially retractable pocket dies may thus lie outside and below the pitch circle.

What is claimed is:

1. In a bearing cage having two rings connected by webs for angular contact two-row ball bearings including bearing cage ring having cage pockets of a partial spherical shape, the combination comprising the radial plane of the bearing passing through the centers of said partial spheres and placed off-center with respect to the bearing cage ring faces, the distance between the radial plane and the face less distant from the radial plane being preferably equal to the radius of the ball, wherein said cage ring is further defined as a set of axially retractable dies having cage pockets formed therein, and wherein the edge formed by the parting of the axially retractable dies serving to form the cage pockets is placed outside the pitch circle.

2. The bearing cage according to claim 1, wherein the cage ring face less distant from the radial plane is arranged exclusively outside the pitch circle of the ball path.

3. The bearing cage of claim 1, wherein webs are provided between said cage pockets with bevels on the free edges thereof.

4. Apparatus of claim 1, wherein said dies are further defined as parted pocket dies with extremely thin wall thicknesses between the cage and pockets.

* * * * *

UNITED STATES PATENT AND TRADEMARK OFFICE
CERTIFICATE OF CORRECTION

PATENT NO. : 4,330,160

DATED : May 18, 1982

INVENTOR(S) : Robert Stolz; Gunter Neder

It is certified that error appears in the above—identified patent and that said Letters Patent is hereby corrected as shown below:

Col. 1, Line 41--following "dies" insert -- to --.

Signed and Sealed this

Sixteenth Day of August 1983

[SEAL]

Attest:

Attesting Officer

GERALD J. MOSSINGHOFF

Commissioner of Patents and Trademarks